(12) United States Patent
Laxminarayana Bhat et al.

(10) Patent No.: US 9,323,785 B2
(45) Date of Patent: Apr. 26, 2016

(54) METHOD AND SYSTEM FOR MOBILE VISUAL SEARCH USING METADATA AND SEGMENTATION

(71) Applicant: STREAMOID TECHNOLOGIES PRIVATE LIMITED, Bangalore (IN)

(72) Inventors: Prasad Horabailu Laxminarayana Bhat, Bangalore (IN); Haricharan Lakshman, Bangalore (IN); Santhosh Lakshmanarao Ananthapadmanabha Rao, Bangalore (IN); Sridhar Manthani, Bangalore (IN)

(73) Assignee: STREAMOID TECHNOLOGIES PRIVATE LIMITED, Bangalore (IN)

( * ) Notice: Subject to any disclaimer, the term of this patent is extended or adjusted under 35 U.S.C. 154(b) by 56 days.

(21) Appl. No.: 14/197,989

(22) Filed: Mar. 5, 2014

(65) Prior Publication Data

US 2014/0254934 A1 Sep. 11, 2014

(30) Foreign Application Priority Data

Mar. 6, 2013 (IN) .............................. 973/CHE/2013

(51) Int. Cl.
*G06K 9/34* (2006.01)
*G06F 17/30* (2006.01)

(52) U.S. Cl.
CPC ................................ *G06F 17/30265* (2013.01)

(58) Field of Classification Search
CPC .................... G06F 17/30265; G06F 17/30247; G06F 17/3025; G06F 17/30259; G06F 17/30256
See application file for complete search history.

(56) References Cited

U.S. PATENT DOCUMENTS

| | | | | |
|---|---|---|---|---|
| 2011/0095908 A1* | 4/2011 | Nadeem | ................... | B60H 3/00 340/905 |
| 2013/0057686 A1* | 3/2013 | Genc | ........................ | B60R 1/00 348/148 |
| 2013/0343642 A1* | 12/2013 | Kuo | ..................... | G06K 9/4652 382/159 |
| 2014/0019264 A1* | 1/2014 | Wachman | .......... | G06Q 30/0276 705/14.72 |

* cited by examiner

*Primary Examiner* — Phuoc Tran
(74) *Attorney, Agent, or Firm* — Barry Choobin; Patent 360 LLC

(57) ABSTRACT

The embodiments herein provide a method and system for providing an image based mobile augmented reality. The system comprises a mobile device comprising a camera for capturing plurality of images, a display screen for displaying results, a GPS module for determining geographical coordinates, an input interface and a client application including a client-side database; and a central server comprising a server-side database and an image matching and ranking module comprising one or more image matching algorithms for performing an image search. The method comprises capturing a query image, transmitting query data to the central server, applying one or more image matching and ranking algorithms to identify database images matching to the search query, extracting relevant information, presenting the extracted relevant information as search results to the user and providing an option to the user to interactively communicate with the system.

4 Claims, 9 Drawing Sheets

METHOD AND SYSTEM FOR MOBILE VISUAL SEARCH USING METADATA AND SEGMENTATION

CROSS-REFERENCE TO RELATED APPLICATIONS

The present application claims priority of an Indian Provisional Patent Application with serial number 973/CHE/2013 filed on Mar. 6, 2013 and entitled, "A method and system for image based mobile augmented reality", the contents of which is incorporated in its entirety herein at least by reference.

BACKGROUND

1. Technical Field

The embodiments herein generally relate to an image based augmented reality and particularly relate to an augmented reality for mobile devices. The embodiments herein more particularly relate to an image based augmented reality system and method configured for augmenting the digital content items according to the response obtained to the search query.

2. Description of the Related Art

Augmented Reality (AR) is a term used to describe a combination of physical and virtual reality in which our live, real-world environment is enhanced or combined with computer-generated content. This can include contents like images, video, or sounds. The content is often interactive and has recently been used in an increasing amount of marketing and advertising.

Augmented reality (AR) is a field of computer research and application that deals with the interaction with both real-world and computer-generated data. At present, most of the AR researches are concerned with the use of live video imagery which is digitally processed and "augmented" by the addition of computer-generated graphics. Advanced research includes the use of motion-tracking data, fiducial marker recognition using machine vision, and the construction of controlled environments containing any number of sensors and actuators. Thus, Augmented Reality can be used to enhance a user's real-world experience or perception using the virtual elements. The use of mobile devices, such as cellular phones or personal digital assistant (PDA) devices is increased dramatically in the last decade. Often, such mobile devices include a camera and display for displaying images at which the camera is pointed. Since people usually carry their camera-enabled mobile devices with them, it would be beneficial to provide additional mobile applications for utilizing the camera and the display capabilities of the mobile devices.

Hence there is a need tort a method and system for providing an augmented reality platform on mobile devices based on image recognition process. There is also need for a method and system for presenting a user with relevant information that he/she seeks and an interface for interacting with the information.

The above mentioned shortcomings, disadvantages and problems are addressed herein and which will be understood by reading and studying the following specification.

OBJECTS OF THE EMBODIMENTS

The primary object of the embodiments herein is to provide a method and system for providing an image based mobile augmented reality platform configured to augment the digital content items according to a response obtained to an input search query.

Another object of the embodiments herein is to provide a method and system for receiving the user's preferences pertaining to the search results through a user interface.

Yet another object of the embodiments herein is to provide a method and system for presenting a user with the search results and the relevant information pertaining to a query originated by the user.

Yet another object of the embodiments herein is to provide a method and system for recognizing, matching and ranking the images retrieved from a database with respect to a query image.

Yet another object of the embodiments herein is to provide a method and system for recognizing the videos, images of moving objects, blurred images, 3D images etc.

These and other objects and advantages of the present invention will become readily apparent from the following detailed description taken in conjunction with the accompanying drawings.

SUMMARY

The various embodiments herein provide an image based augmented reality platform for mobile devices. The present invention provides a system and method configured for augmenting the digital content items according to a user's response to the results obtained for an image search query. According to one embodiment herein, the system comprises a mobile device and a central server. The mobile device further comprises a camera for capturing a plurality of images, a display screen, a location determination Module (GPS) for determining the geographical coordinates, an input interface and a client application. The client application further includes a client-side database. The central server further comprises a server-side database and an image matching and ranking module. The image matching and ranking module further comprises one or more image matching algorithms for performing an image search.

According to an embodiment herein, the system further comprises a web based application for providing an image based mobile augmented reality platform configured to augment the digital content items with respect to a search query.

According to an embodiment herein, the client application is accessed by a user to manage one or more tasks/activities performed at the mobile device.

According to an embodiment herein, the mobile device further comprises an image compressing module for compressing the captured or query images before sending or transmitting query data to the central server over the network. The compression of the image or video or feature descriptors is performed in order to reduce a bit transmission rate of the images. When the resolution of the captured image or video is more than a predefined threshold limit, the image compression module downscales and compresses the image or video to achieve a quick transmission of the image or video over the network to the central server.

According to an embodiment herein, the location determination module of the mobile device is configured for determining/estimating a location of the mobile device at the time of image or video capture. The location determination module acquires the geographical coordinates of the location of a mobile device to identify the location of the mobile device at the time of image capture. The module further records the time of the image capture. The acquired geographical co-ordinate and timing information along with the captured image is stored at the client database by the client application. This timing information from the database can be accessed at any time for further or future processing. The information is further transmitted to the central sever as a search query along with the captured image or video. The geo-location and timing information helps to refine the image search.

According to an embodiment herein, the central server further comprises a server database for storing the images or videos with relevant data, an image processing module for processing the received image or video, and a search engine for identifying a match for the received image or video and extracting the relevant information pertaining to the image or video.

According to an embodiment herein, the central server is selected from the group consisting of a physical server, a group of servers and a server hosted on a cloud.

According to an embodiment herein, the client application is pre-installed in the mobile device. The client application performs an image searching process for a query image within the client-side database of the mobile device and presents search results for the query image.

According to an embodiment herein, the client application performs the image searching process for the query image within the client-side database of the mobile device and transfers the search results and the query image or feature based representation along with a time stamp, geographical coordinates of the location of the mobile device to the central server over a network.

According to an embodiment herein, the central server comprises a plurality of working nodes for processing a plurality of search queries. Further, at-least one working node is selected based on pre-defined criteria for processing each search query.

According to an embodiment herein, the image matching and ranking module of the central server runs at least one stage of image matching algorithm. The image matching algorithm filters the server-side database using the geographical coordinates, the timing information and the query image to identify zero or one or more images matching to the query image.

According to an embodiment herein, the user interface of the mobile device is configured for allowing an interaction between the user and the client application. The user interface unit provides an option for the user to interact with the image search results. The user is provided with an opportunity to further filter and expand the search results of augmented reality, using the user preferences and contexts.

According to an embodiment herein, a method for image searching using the geographical coordinates of the location of the mobile device and time is provided. The method comprises the steps of: acquiring a query image from a mobile device; extracting the image features of the query image; extracting the image features of the database images; calculating a matching score for the database image, and wherein the matching score is calculated based on the differences between the extracted image features of the query image and the extracted image features of the database image; identifying the matching database images based on the matching score; extracting the geographical coordinates of the identified matching database images; extracting the geographical coordinates of the query image, and wherein the geographical coordinates of the query image is matched with the geographical coordinates of the identified matching database images; extracting a time stamp of the query image; extracting a time information of meta data in the identified matching database image, and wherein the time stamp of the query image is matched with the time information of meta data in the identified matching database image; computing joint matching score, and wherein the joint matching score is computed by mapping the calculated matching score of the database image, the matched results of the geographical coordinates of the query image and the geographical coordinates of the query image, and the matched time stamp of the query image with the time information of meta data in the database image; defining a threshold matching score to identify a match between the query image and the database image, and wherein the database image is identified as a matching image to the query image when the computed joint matching score of the database images is less than the pre-defined threshold matching score; ranking the database images based on the computed joint matching score; and displaying one or more database images by ranking based on the relevance.

According to an embodiment herein, the joint matching score is computed based on a linear combination of the scores. The liner combination of scores comprises matching score of the database image; matching score of the geographical coordinates of the query image and the geographical coordinates of the query image; and matching score of the time stamp of the query image with the time information of metadata in the database image.

According to an embodiment herein, the time stamp of the query image is a time of capturing an image through the mobile device, and wherein the time information of the database images is a time of storing an image in the database.

According to an embodiment herein, a method for a multistage image searching by segmenting an image into a plurality of segments is provided. The method comprises the steps of: segmenting a plurality of database images into a plurality of segments; generating global signatures for each segment of the database images and storing the global signatures corresponding to each segment; generating global signatures for the entire query image and for each segments of the query image; storing the global signatures corresponding to the entire query image and for each segments of the query image; matching global signatures of the query image or the global signatures of each segments of the query image with the global signatures of each segments of the database images; computing global signature matching scores for the database images; generating a single common list for the database images; selecting a subset of the database images by ranking based on the computed global signature matching scores; applying the local feature matching algorithms on the selected subset of database images; and displaying one or more database images by ranking based on the relevance.

According to an embodiment herein, the number of images in the selected subset is limited by a predetermined maximum number of database images to be identified for the subsequent local feature matching process to limit the computational complexity.

According to an embodiment herein, the query image is split into at-least two segments along the longer dimension of the query image.

According to an embodiment herein, the query image is segmented into the plurality of segments along object boundaries using object boundary detection modules.

According to an embodiment herein, the query image is segmented into a plurality of segments based on the distribution of feature points in the query image, and wherein the distribution of feature points in the query is used to group a set of pixels into the plurality of segments.

According to an embodiment herein, a method for multistage image searching by applying an inverted index search on a segmented query image is provided. The method comprises the steps of: segmenting a plurality of database images into multiple segments; determining a list of quantization indices corresponding to features present in each of the segments in the database images; segmenting a query image into a plurality of segments; determining a list of quantization indices corresponding to the features present in query image and the features present in each of the segments in the query images; identifying a first subset of database images that have non-zero occurrence of the determined query feature quantization indices through an inverted index search; computing a global signature for the query image and for each of the segments of the query image; computing a global signature for the query image and for each of the segments of the database images that are identified through the inverted index search; matching the global signatures of the query image or the global signatures of the segments of the query image with the global signatures of the database images segments that are identified through the inverted index search; identifying a second subset of database images that matches with the global signatures of the query image or the segments of the query image; matching local features of the query image with the local features of the database images in the second subset; and displaying one or more database images by ranking based on the local features matching scores.

According to an embodiment herein, the second subset selection comprises identifying a predetermined maximum number of database images based on global signature matching scores, to limit the computational complexity of the subsequent local feature matching process.

According to an embodiment herein, the second subset selection process selects database images based on global matching scores up to a certain predetermined threshold, to limit the computational complexity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
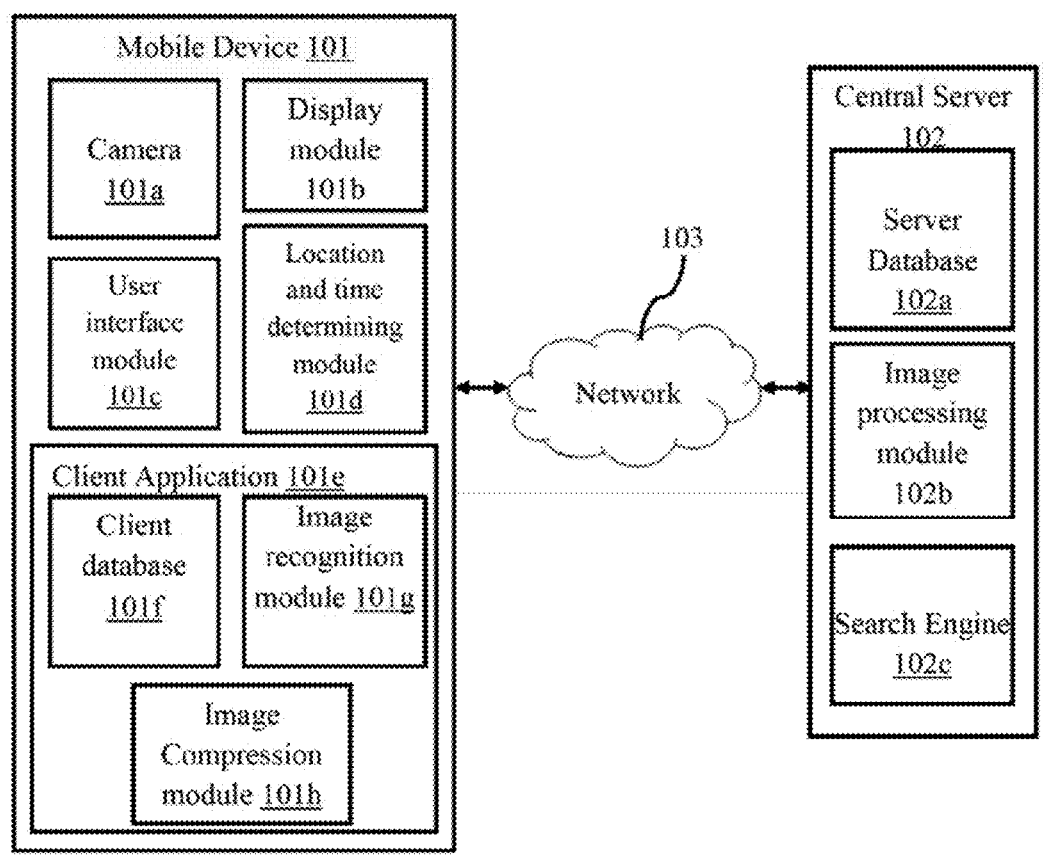
FIG. 1 illustrates a block diagram of a system architecture of an image based mobile augmented reality system configured to augment the digital content items with respect to an image search query through a mobile device, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an image based augmented reality platform for mobile devices. The present invention provides a system and method configured for augmenting the digital content items according to a user's response to the results obtained for an image search query. According to one embodiment herein, the system comprises a mobile device and a central server. The mobile device further comprises a camera for capturing a plurality of images, a display screen, a location determination module (GPS) fix determining the geographical coordinates, an input interface and a client application. The client application further includes a client-side database. The central server further comprises a server-side database and an image matching and ranking module. The image matching and ranking module further comprises one or more image matching algorithms for performing an image search.

According to an embodiment herein, the system further comprises a web based application for providing an image based mobile augmented reality platform configured to augment the digital content items with respect to a search query.

According to an embodiment herein, the client application is accessed by a user to manage one or more tasks/activities performed at the mobile device.

According to an embodiment herein, the mobile device further comprises an image compressing module for compressing the captured or query images before sending or transmitting query data to the central server over the network. The compression of the image or video or feature descriptors is performed in order to reduce a bit transmission rate of the images. When the resolution of the captured image or video is more than a predefined threshold limit, the image compression module downscales and compresses the image or video to achieve a quick transmission of the image or video over the network to the central server.

According to an embodiment herein, the location determination module of the mobile device is configured for determining/estimating a location of the mobile device at the time of image or video capture. The location determination module acquires the geographical coordinates of the location at a mobile device to identify the location of the mobile device at the time of image capture. The module further records the time of the image capture. The acquired geographical co-ordinate and timing information along with the captured image is stored at the client database by the client application. This timing information from the database can be accessed at any time for further or future processing. The information is further transmitted to the central sever as a search query along with the captured image or video. The geo-location and timing information helps to refine the image search.

According to an embodiment herein, the central server further comprises a server database for storing the images or videos with relevant data, an image processing module for processing the received image or video, and a search engine for identifying a match for the received image or video and extracting the relevant information pertaining to the image or video.

According to an embodiment herein, the central server is selected from the group consisting of a physical server, a group of servers and a serer hosted on a cloud.

According to an embodiment herein, the client application is pre-installed in the mobile device. The client application performs an image searching process for a query image within the client-side database of the mobile device and presents search results for the query image.

According to an embodiment herein, the client application performs the image searching process for the query image within the client-side database of the mobile device and transfers the search results and the query image or feature based representation along with a time stamp, geographical coordinates of the location of the mobile device to the central server over a network.

According to an embodiment herein, the central server comprises a plurality of working nodes for processing a plurality of search queries. Further, at-least one working node is selected based on pre-defined criteria for processing each search query.

According to an embodiment herein, the image matching and ranking module of the central server runs at least one stage of image matching algorithm. The image matching algorithm filters the server-side database using the geographical coordinates, the timing information and the query image to identify zero or one or more images matching to the query image.

According to an embodiment herein, the user interface of the mobile device is configured for allowing an interaction between the user and the client application. The user interface unit provides an option for the user to interact with the image search results. The user is provided with an opportunity to further filter and expand the search results of augmented reality, using the user preferences and contexts.

According to an embodiment herein, a method for image searching using the geographical coordinates of the location of the mobile device and time is provided. The method comprises the steps of: acquiring a query image from a mobile device; extracting the image features of the query image; extracting the image features of the database images; calculating a matching score for the database image, and wherein the matching score is calculated based on the differences between the extracted image features of the query image and the extracted image features of the database image; identifying the matching database images based on the matching score; extracting the geographical coordinates of the identified matching database images; extracting the geographical coordinates of the query image, and wherein the geographical coordinates of the query image is matched with the geographical coordinates of the identified matching database images; extracting a time stamp of the query image; extracting a time information of meta data in the identified matching database image, and wherein the time stamp of the query image is matched with the time information of meta data in the identified matching database image; computing a joint matching score, and wherein the joint matching score is computed by mapping the calculated matching score of the database image, the matched results of the geographical coordinates of the query image and the geographical coordinates of the query image, and the matched time stamp of the query image with the time information of meta data in the database image; defining a threshold matching score to identify a match between the query image and the database image, and wherein the database image is identified as a matching image to the query image when the computed joint matching score of the database images is less than the pre-defined threshold matching score; ranking the database images based on the computed joint matching score; and displaying one or more database images by ranking based on the relevance.

According to an embodiment herein, the joint matching score is computed based on a linear combination of the scores. The liner combination of scores comprises matching score of the database image; matching scare of the geographical coordinates of the query image and the geographical coordinates of the query image; and matching score of the time stamp of the query image with the time information of meta-data in the database image.

According to an embodiment herein the time stamp of the query image is a time of capturing an image through the mobile device, and wherein the time information of the database images is a time of storing an image in the database.

According to an embodiment herein, a method for a multi-stage image searching by segmenting an image into a plurality of segments is provided. The method comprises the steps of: segmenting a plurality of database images into a plurality of segments; generating global signatures for each segment of the database images and storing the global signatures corresponding to each segment; generating global signatures for the entire query image and for each segments of the query image; storing the global signatures corresponding to the entire query image and for each segments of the query image; matching global signatures of the query image or the global signatures of each segments of the query image with the global signatures of each segments of the database images; computing global signature matching scores for the database images; generating a single common list for the database images; selecting a subset of the database images by ranking based on the computed global signature matching scores; applying the local feature matching algorithms on the selected subset of database images; and displaying one or more database images by ranking based on the relevance.

According to an embodiment herein, the number of images in the selected subset is limited by a predetermined maximum number of database images to be identified for the subsequent local feature matching process to limit the computational complexity.

According to an embodiment herein, the query image is split into at-least two segments along the longer dimension of the query image.

According to an embodiment herein, the query image is segmented into the plurality of segments along object boundaries using object boundary detection modules.

According to an embodiment herein, the query image is segmented into a plurality of segments based on the distribution of feature points in the query image, and wherein the distribution of feature points in the query is used to group a set of pixels into the plurality of segments.

According to an embodiment herein, a method for multi-stage image searching by applying an inverted index search on a segmented query image is provided. The method comprises the steps of: segmenting a plurality of database images into multiple segments; determining a list at quantization indices corresponding to features present in each of the segments in the database images segmenting a query image into a plurality of segments; determining a ht of quantization indices corresponding to the features present in query image and the features present in each of the segments in the query images; identifying a first subset of database images that have non-zero occurrence of the determined query feature quantization indices through an inverted index search; computing a global signature for the query image and for each of the segments of the query image; computing a global signature for the query image and for each of the segments of the database images that are identified through the inverted index search; matching the global signatures of the query image or the global signatures of the segments of the query image with the global signatures of the database images segments that are identified through the inverted index search; identifying a second subset of database images that matches with the global signatures of the query image or the segments of the query image; matching local features of the query image with the local features of the database images in the second subset; and displaying one or more database images by ranking based on the local features matching scores.

According to an embodiment herein, the second subset selection comprises identifying a predetermined maximum number of database images based on global signature matching scores, to limit the computational complexity of the subsequent local feature matching process.

According to an embodiment herein, the second subset selection process selects database images based on global matching scores up to a certain predetermined threshold, to limit the computational complexity.

The various embodiments of the present invention provide an image based augmented reality system and platform for mobile devices. The present invention provides a system and method configured for augmenting the digital content items according to a user's response to results obtained for an image search query.

FIG. 1 is a system block diagram illustrating the architecture of an image based mobile augmented reality system configured to augment the content items with respect to an image search query through a mobile device, according to an embodiment of the present invention. With respect to FIG. 1, the system comprises a mobile device 101 and a central server 102. The mobile device 101 further comprises a camera 101a for capturing the images or videos, a display module 101b for displaying the information to the user, a user interface module 101c for receiving the user's response pertaining to the image search, a location and time determining module (including but not limited to GPS) 101d for locating the mobile device 101 and to client application 101e pre-installed in the mobile device 101. The client application 101e further comprises a client database 101f for storing the relevant information corresponding to the images, an image recognition module 101g for searching the captured image in the client database, and a compression module 101h for compressing the captured images or feature descriptors. The client application 101e is configured to manage the tasks/activities performed at the mobile device 101 and is accessed by the user to originate the search query by capturing an image or video from the camera 101a of the mobile device 101. The location determination module 101d determines the information pertaining to the geographical location of the mobile device 101 along with time of image or video capture. This information along with captured image or video is further stored in the client database 101f for future reference. The image recognition module 101g performs the process of image recognition within the client database 101f of the mobile device 101 and presents the results to the user through a display module 101b. The user further provides inputs pertaining to the search through user interface module 101c. The client application 101e further transmits the captured image or video along with the relevant information (including but not limited to the client database search results, user preference, geographical, feature-based and timing information pertaining to the captured image or video) to the central server/database 102 as the search query through a network 103. Before transmitting of the search query, the captured image is downscaled and compressed by the image compression module 101h, to reduce the bit rate during transmission of the search query.

According to an embodiment herein, the central server 102 further comprises a server database 102a for storing images or videos with the relevant data, at image processing module 102b for processing the received image or video, a search engine 102c for identifying a match for the received image or video and extracting the relevant information pertaining to the image or video. The central server 102 is any one of a physical server or a group of servers or hosted on a cloud. The central Server 102 comprises a pool or group of working nodes for processing the search queries obtained from the mobile device 101. At least one working node is selected based on pre-defined criteria for processing each search query. The image processing module 102b of the central server 102 is configured to use one or more image processing algorithms for filtering and processing the received image or video from the search query. The search engine 102c further applies at least one stage of image matching algorithm for filtering the server-side database using the geo-location data of the user and the query image as well as timing information of the database image and the query image to identify zero one or man items applicable to the query image and presents the user with relevant information as the search results.

According to an embodiment herein, the user launches the client application 101e and originates the search query by capturing an image/video from the camera 101a of the mobile device 101. The camera 101a used to capture the image or video is any one of a primary camera, a secondary camera, a basic VGA camera, a CMOS camera and the like. The user captures an image or video by accessing the camera 101a through the client application 101e or the image or video is captured directly using the pre-installed camera application of the mobile device 101. The captured image or video is used as the search query for the search operation. The captured image or video is further stored in the client database 101f for future reference.

According to an embodiment herein, the camera 101a of the mobile device 101 captures an image or a video as a search query. A video comprises a plurality of image frames, wherein the consequent frames are played continuously to form the video. When the captured video is used as the search query, each image frame of the video is treated as a separate image, and the image processing is done individually on each of the image frames. The image processing algorithms detect or recognize the one or more objects in the video frame, based on the pre-defined frames per second ratio and a searching procedure is employed for finding a match for the multiple recognized objects in the video. All the frames or subset of frames of the video are interpreted as the search queries for the user. The user selects one or more frames as the search queries and the searching procedure is applied on the search queries to extract the relevant information corresponding to the selected frames.

According to an embodiment herein, the location determination module 101d of the mobile device 101 is configured for determining a location of the mobile device at the time of image or video capture. The location determining module 101d includes a GPS module for acquiring the geographical coordinates of the location of the mobile device to identify the location of the mobile device 101 at the time of image capture. The location determining module 101d further records the timings of the image capture. The acquired geographical co-ordinates and the timing information along with the captured image are stored at the client database 101f by the client application 101e. This stored information from the client database 101f is accessed at any time for further or future processing. The information is further transmitted to the central sever 102 as a search query along with the captured image or video. The geo-location and timing information helps to refine the image search, so that the user is presented with the location based search results with respect to the user location. For example: the local events related to the user location are displayed, shopping deals/advertisements related to the user location is displayed, the language of an audio content is selected based on the user location, etc. The geo-location data of the mobile device further reduces the search space in the server-side database 102a. The geo-location data of the user is also used for ranking the search results for each query.

According to an embodiment herein, the client database 101f of the mobile device 101 is configured for storing the images and videos and the relevant information corresponding to the stored images or videos. The search query is first searched at the client database 101f for obtaining relevant information pertaining to the search query. The client database 101f is updated by the central server 102 at regular intervals or upon receiving the input data such as promotional data, advertisement data, etc. of one or more products or services from a plurality of vendors. The client database 101f is built using the systems such as but not limited to MySQL, PostGRESQL, OracleDB, etc.

According to an embodiment herein, the image compression module 101h of the mobile device 101 is configured to compress the captured query image or video or feature based representation before transmitting it to the central server 102. The compression of the data to be transmitted is performed to reduce the bit transmission rate of the images. When the resolution of the captured image or video is more than a predefined threshold limit, the image compression module downscales and compresses the image or video to accomplish or achieve a quick transmission of the image or video over the network to the central server 102.

According to an embodiment herein, the mobile device 101 comprises a display module 101b configured to display the search results to the user, so that the user views the search results and provides required inputs pertaining to the search. The consolidated list of the search results from the client-side search and the server-side search is presented to the user interface provided in the client application 101e of the mobile device 101, as a response to the search query.

According to an embodiment herein, the client/user interface module 101c of the mobile device 101 is configured to provide an interaction between the user and the client application. The client/user interface unit 101c provides an option for the user to interact with the image search results. The user is provided with an opportunity to further filter and expand the search results of augmented reality, using the user preferences and contexts. Furthermore, the user preference settings (such as but not limited to language, favourite sources, etc.) are saved within the client application and used to present the search results. In yet another preferred embodiment, the user model is learned based on past searches.

According to an embodiment of the present invention, the captured image along with the relevant information (including but not limited to geo-location co-ordinates, timing information of the captured image and the search results from the client database) are transmitted directly to the central server 102 as a search query for retrieving the search results from the server-side database 102a of the central server 102. The image search query is transmitted to the central server 102 over a wired or wireless network 103. The Central Server 102 is configured for matching the images to identify the database entries applicable to the query and presents the user with relevant information.

According to an embodiment of the present invention, the received image or video undergoes several image processing stages/operations for extracting metadata relevant to the search query and for matching the search query metadata with the metadata stored in the server database 102a. The image processing module 102b of the central server 102 applies the plurality of image processing algorithms for filtering, enhancing, feature extracting and classifying the search query.

According to an embodiment of the present invention, the received image firstly undergoes an image pre-processing operation. The image processing module 102b uses the plurality of image pre-processing algorithms for filtering the unwanted noise signals from the received image. The received image is also subjected to the image enhancement algorithms to improve the quality and resolution of the images.

According to an embodiment of the present invention, the image pre-processing operation/stage is followed by an object recognition and tracking operation/stage or step. In this stage, the image processing module 102b identifies the multiple objects/entities in the received image. The recognized multiple objects/entities are used for expanding the search results with semantically relevant extensions. The image processing module 102b further suggests various possible relationships among the objects captured. The image processing module 102b further tracks the various moving objects, in case of the video received, using various object tracking algorithms.

According to an embodiment herein, the processed images are compared with the images stored in server database 102a and the matched images are ranked based on matching relevance. The search engine 102c at the central server 102 uses the image matching and ranking algorithms to recognize one or more images that match the search query and to rank the matched images according to highest relevance. For a query video, the image processing module identifies the continuous frames in a video and performs the image recognition process on the subset of frames or all the frames consecutively. The image matching algorithm extracts the local features and image points of the captured image or the individual frames in a video. The feature points are detected using edge detectors, corner detectors, blob detectors, difference of filtered images, etc. The search engine 102c applies an image matching algorithm which involves computing a distance metric of the features of the query image to the features of each of the database images to be searched. The image matching algorithm comprises a plurality of local feature detecting algorithms like Scale invariant feature transform (SIFT), Speeded up robust features (SURF), Gradient Location and Orientation Histogram (GLOH), etc., which are particularly effective in an image matching operation. The local features are represented using scalar or vector quantizers (like k-means mapping) for building a vocabulary tree of features in the database images.

According to an embodiment herein, the image matching algorithm computes a joint matching score to measure the similarities or differences between the search query and the database images.

According to an embodiment herein, the system further comprises a web based application for providing an image based mobile augmented reality configured to augment digital content items with respect to a search query.

Figure 2:
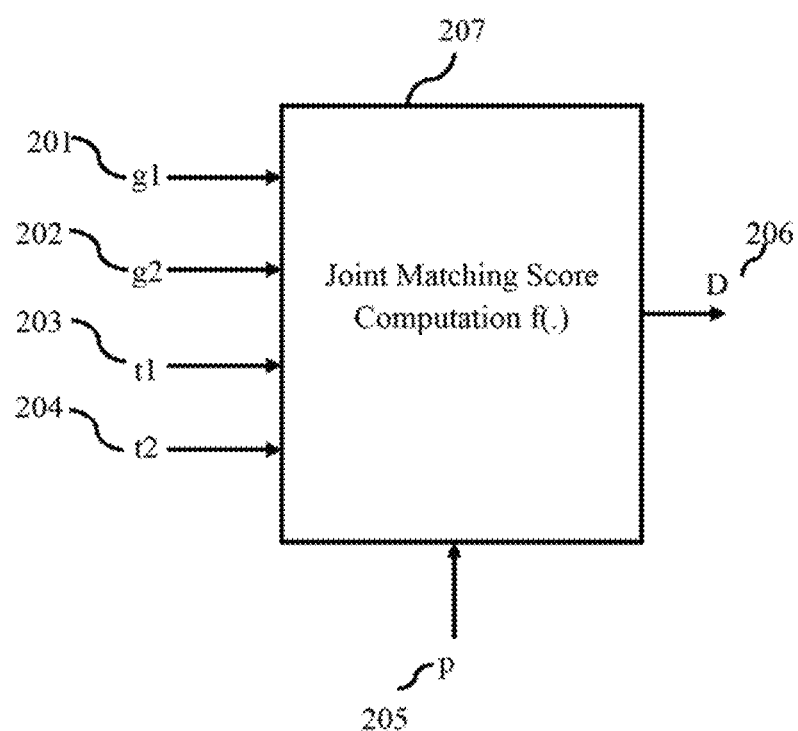
FIG. 2 illustrates a block diagram a system for computing a joint matching score, according to an embodiment herein.

FIG. 2 illustrates a block diagram of a system for computing a matching score, according to the present invention. With respect to FIG. 2, the joint matching score (D) 206 is computed based on the input parameters such as an image features based difference (p) 205 between the query image and a database candidate image, a geo-location of query image (g1) 201, a geo-location of a database image (g2) 202, a timing information corresponding to the query image (t1) 203, and time information of metadata in the database image (t2) 204. Further, the ranking of the database images is done based on the computed matching score 206. A processing module 207 is employed to compute the joint matching score 206.

The equation for computing joint matching score (D) 206 is $$D=f(g1,g2,t1,t2,p)$$

Wherein, the function f(.) jointly maps the parameters g1, g2, t1, t2, p to the matching score (D) 206. Further a threshold value (Tp) is pre-defined and is used to identify a match for the search query. If p<Tp, the database image is identified as the match with the query image. Otherwise, the database image is taken as no match by setting (D) 206 to infinity (or a very high number).

According to an embodiment herein, the image processing module comprises one or more image ranking algorithms for ranking the matched database images. The algorithm ranks the matched images based on 'g1', 'g2' and 't2' values. The algorithm further excludes certain matched images based on 'g1', 'g2', 't1', and 't2'. The relevance between the search query and the database image is calculated based on the 'D' value. Lower the value of 'D', higher is the relevance between the search query and the database image.

A specific example for the function f(.) is a linear combination of the above listed parameters in the following form:

$$D=Wg*Dg(g1,g2)+Wt*Dt(t1,t2)$$

Wherein,

Dg: is a function that computes the distance between g1 and g2,

Dt: is a function that computes the difference between t1 and t2,

Wg and Wt: control relative importance of geo-location and time.

Further, the ranking of the images is performed depending on the value of (D). A lower value of (D) indicates a higher relevance of the matching images. Hence, the final results are presented to the user by ranking based on relevance.

Further, the exclusion of irrelevant matching images is achieved as follows: A window in space S (for example: 100 units) and a window in time T (e.g. 6 units) is defined. If Dg (g1, g2)>S or Dt (t1, t2)>T, the matched database image is excluded from the final list, even though they might have been matching based on pixel information. The testing for exclusion is carried out before the pixel based matching in order to save computational resources. Many strategies can be achieved by optimizing Dg and Dt, for example, Dg (g1, g2) can be set to a very high value, if g1 and g2 are from different geographical areas, thereby promoting local results.

Figure 3A:
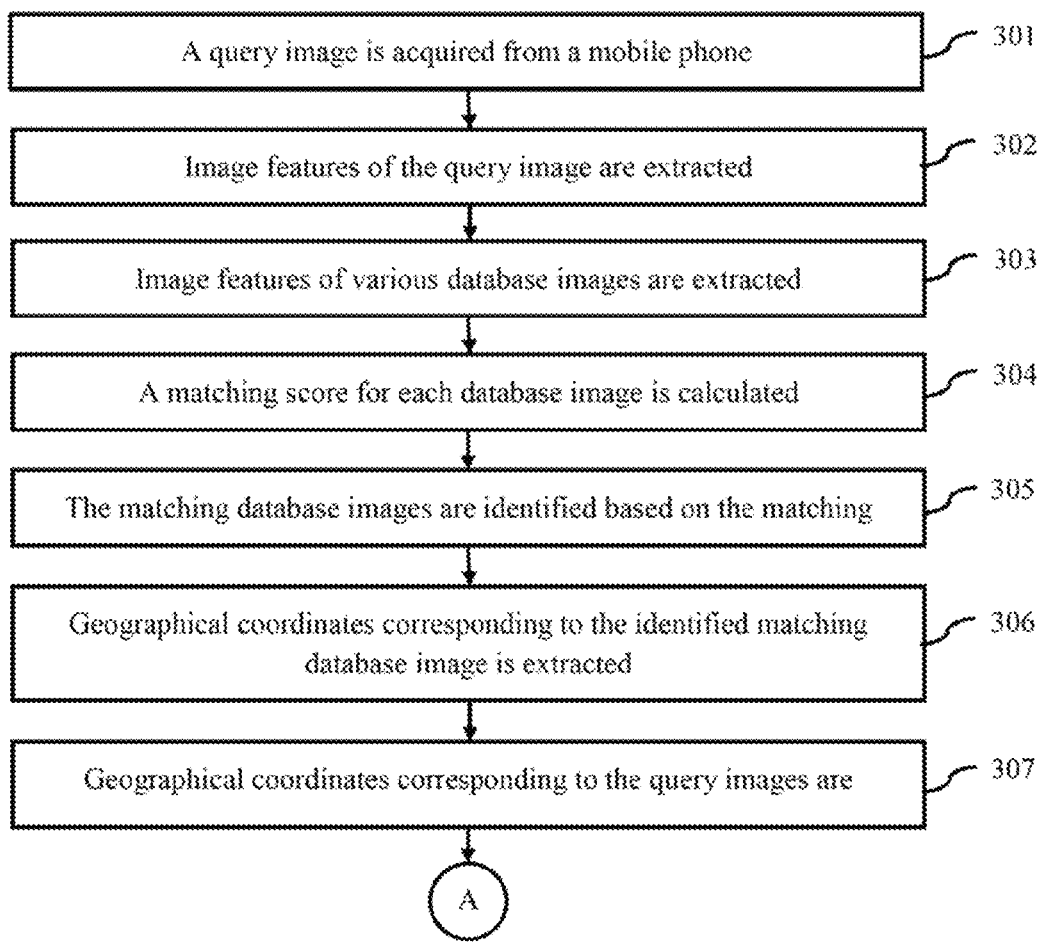
FIG. 3A and FIG. 3B jointly illustrates a flowchart indicating a method for computing joint matching scores using geographical coordinates and timing information of the search query and the database images, according to an embodiment herein.
Figure 3B:
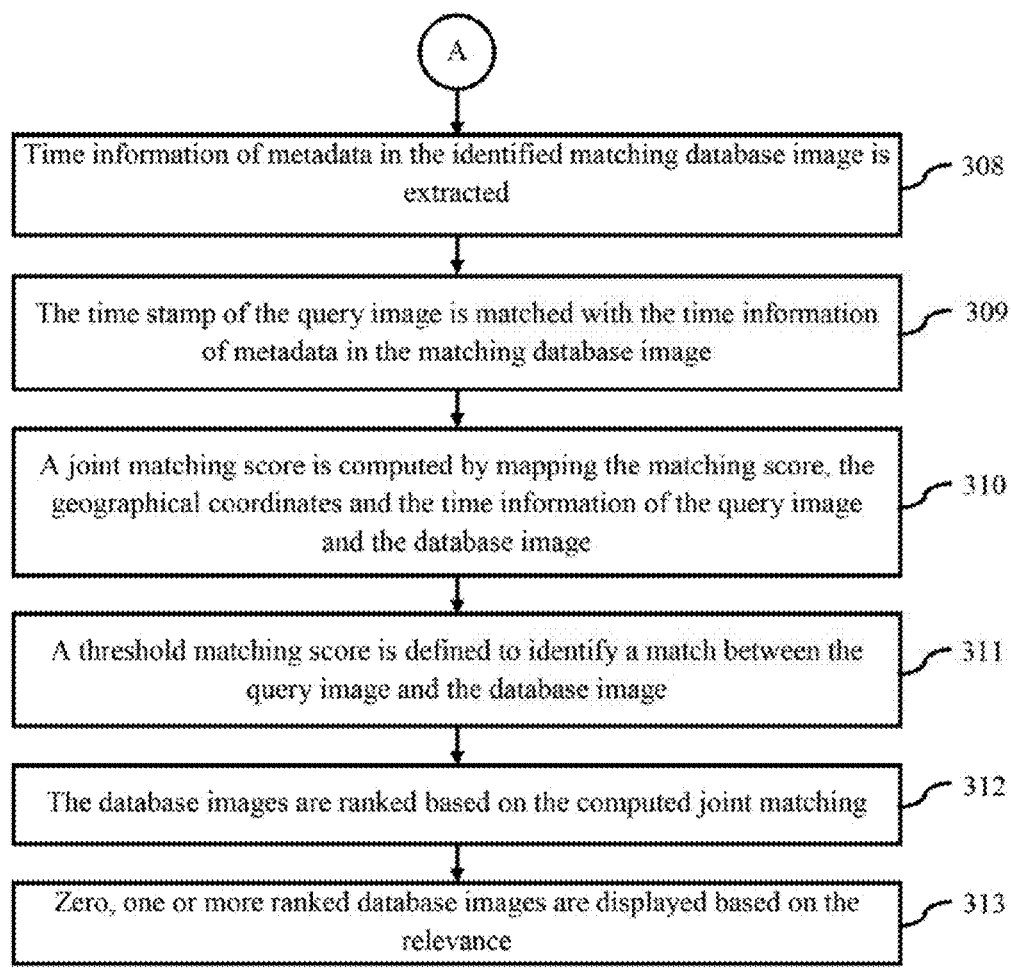

FIG. 3A and FIG. 3B jointly illustrates a flowchart explaining a method for computing joint matching scores using geographical coordinates and timing information of the search query and the database images, according to the present invention, according to an embodiment of the present invention. The method comprises applying one or more image matching algorithms for measuring similarities or differences between the search query and the database images based on the joint matching scores. With respect to FIG. 3, the method comprises the following steps: The query image is acquired from the mobile device (301). A plurality of image features corresponding to the query image is extracted (302). A plurality of image features corresponding to the plurality of database image is extracted (303). A matching score for each database image is calculated based on the differences between the extracted image features of the query image and the extracted image features of the database image (304). Based on the matching score, a plurality of database images matching the query image is identified (305). Further the geographical coordinates corresponding to the matched database images are extracted from the database (305). Furthermore the geographical coordinates corresponding to the query image are extracted from the search query (307). The geographical coordinates of the query image are matched with the geographical coordinates of the matched database images. A time stamp of the query image is extracted from the search query. The time stamp of the query image is the time of capturing an image through the mobile device or a time of initializing a query image search through the mobile device. The time information of metadata in the matched database image is extracted from the database (308). The time information of the database images is a time of occurrence of the event denoted by the database image, or time of storing an image in the database. The time stamp of the query image is matched with the time information of metadata in the matched database image (309). A joint matching score is computed by mapping the calculated matching score of the database image, the matched results of the geographical coordinates of the query image and the geographical coordinates of the query image, and the matched time stamp of the query image with the time information of metadata in the database image (310). Furthermore a threshold matching score is defined to identify a match between the query image and the database image (311). The database image is identified as a matching image to the query image when the computed joint matching score of the database images is less than the pre-defined threshold matching score. The matched database images are ranked based on the computed joint matching score (312) and zero, one or more ranked database images are displayed based on the ranking relevance (313).

According to an embodiment herein, the search engine of the central server employs an enhanced search algorithm for matching the features between the search query and the matched database images. The search algorithm incorporates a global matching stage before the local matching stage to reduce the number of images to be tested in the local stage. In the global stage, a compact signature is computed based on the entire query image, whereas in the local stage, feature descriptors are computed based on a local set of pixels. In the local stage, various local matching algorithms are applied on the search query and the database images. The local matching algorithm comprises various local feature representation algorithms like Scale invariant feature transform (SIFT), Speeded up robust features (SURF), Gradient Location and Orientation Histogram (GLOH), etc., which are particularly effective in image matching. The local features are represented using scalar or vector quantizers (like k-means mapping) for building a vocabulary tree of features in the database images.

Global signatures like Vector of locally aggregated descriptors (VLAD), Residual enhanced visual vectors (REVV) provide a compact signature of an image for approximate matching. The combination of global and local stages offers a trade-off that makes the system fast as well as accurate.

According to an embodiment herein, when a user generates the search query (image) at the mobile device, the captured query image may contain a surrounding text or the other images along with the actual image of interest. Due to the surrounding data, the query global signature may become very different compared to the database global signature of the actual image of interest. Hence, the database image which in fact corresponds correctly to the object of interest may end up being rejected in the global stage. In order to extract the object of interest and further enhance the image search accuracy, the query image is segmented into multiple segments and the global matching is carried out on each of these segments, rather than matching the entire query image.

Figure 4:
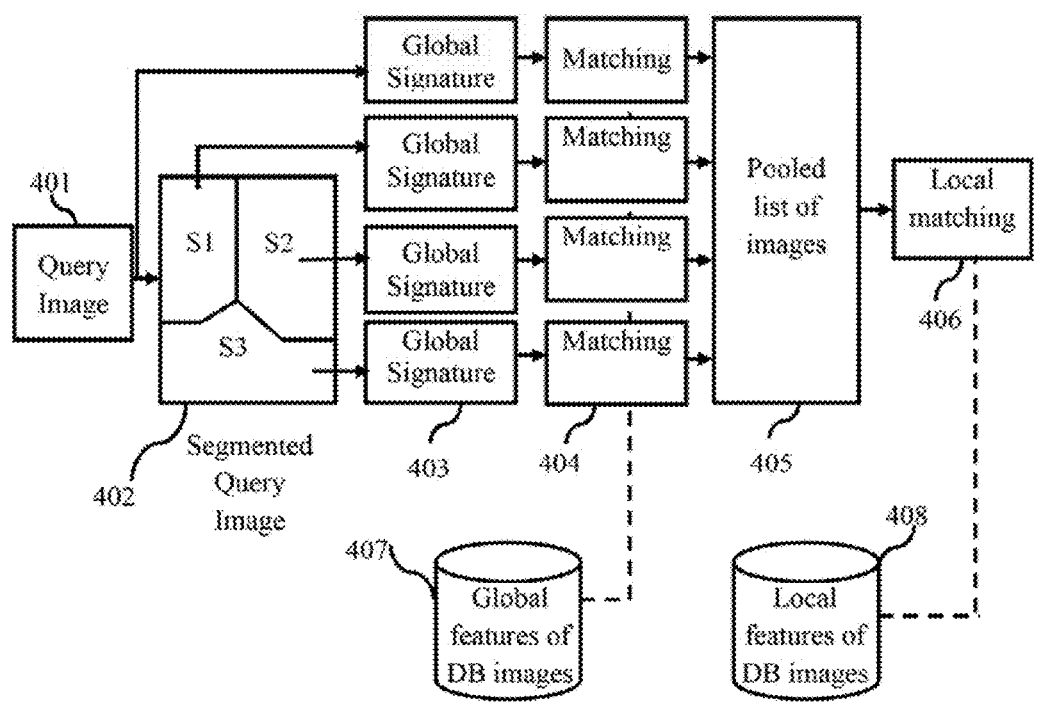
FIG. 4 illustrates a block diagram of a system for multi-stage image searching by segmenting an image into multiple segments, according to an embodiment herein.

FIG. 4 illustrates a block diagram of a system for a multi-stage image searching by segmenting an image into multiple segments, according to the present invention. With respect to FIG. 4, the query image 401 is divided into multiple segments to generate a segmented image 402. A global signature 403 for each segment of the search query is generated. The global signature 403 of each segment is matched 404 with global signature of database images 407. The matched database images are pooled or grouped into a single common list of images 405 based on the ranking of the global signature matching scores. The pooling stage allows a predetermined maximum number of database images 408 to be considered for local matching 406 in order to limit the computational complexity. The pooling stage further uses the matching scores from previous stages to decide the list of images that need to be tested further. Then, a local stage (feature matching algorithm) 406 operates only on the database images 408, which are pooled in to the single common list.

According to an embodiment herein, a global signature 403 for the query image 401 without segmenting the query image 401 is generated. The global signature 403 of the query image 401 is matched 404 with the global signature of database images 407. The matched database images are pooled or grouped into a single common list of images 405 based on the ranking of the global signature matching scores. The pooling stage allows a predetermined maximum number of database images 408 to be considered for local matching 406 in order to limit the computational complexity. The pooling stage further uses the matching scores from previous stages to decide the list of images that need to be tested further. Then, a local stage (feature matching algorithm) 406 operates only on the database images 408, which are pooled in to the single common list.

According to an embodiment herein, the image segmentation algorithm employs various methods for segmenting the query image. The methods for segmenting the query image comprises: segmenting the query image on the longer side, object based segmentation and feature based segmentation.

According to an embodiment herein, the method of segmenting the query image on the longer side comprises splitting the query image into at-least two segments along the longer dimension of the query image. When a use captures an image of interest, the image is generally captured without cropping on the shorter dimension of the image, while potentially cropping along the longer dimension and introducing more surrounding text/data. The segmentation method segments the image along the longer dimension of the query image to crop the surrounding unwanted data/text.

According to an embodiment herein, segmenting the query image using object based method comprises splitting the query image into multiple segments along object boundaries using object boundary detection modules.

According to an embodiment herein, the method of feature based segmenting the query image comprises grouping a set of pixels into segments by using distributed feature points in the query image, for example, a dense set of feature points is grouped into a single segment.

According to an embodiment herein, the database images are further segmented and global signatures are stored corresponding to each segment During the global matching stage (first stage of image matching), the signature of each segment of the query image is matched with the stored signatures of each segment of the database images. When the signature of a single segment of the query image matches well with the signature of a segment of the database image, the database image is selected in the pooling stage for subsequent local testing (second stage of image matching).

Figure 5:
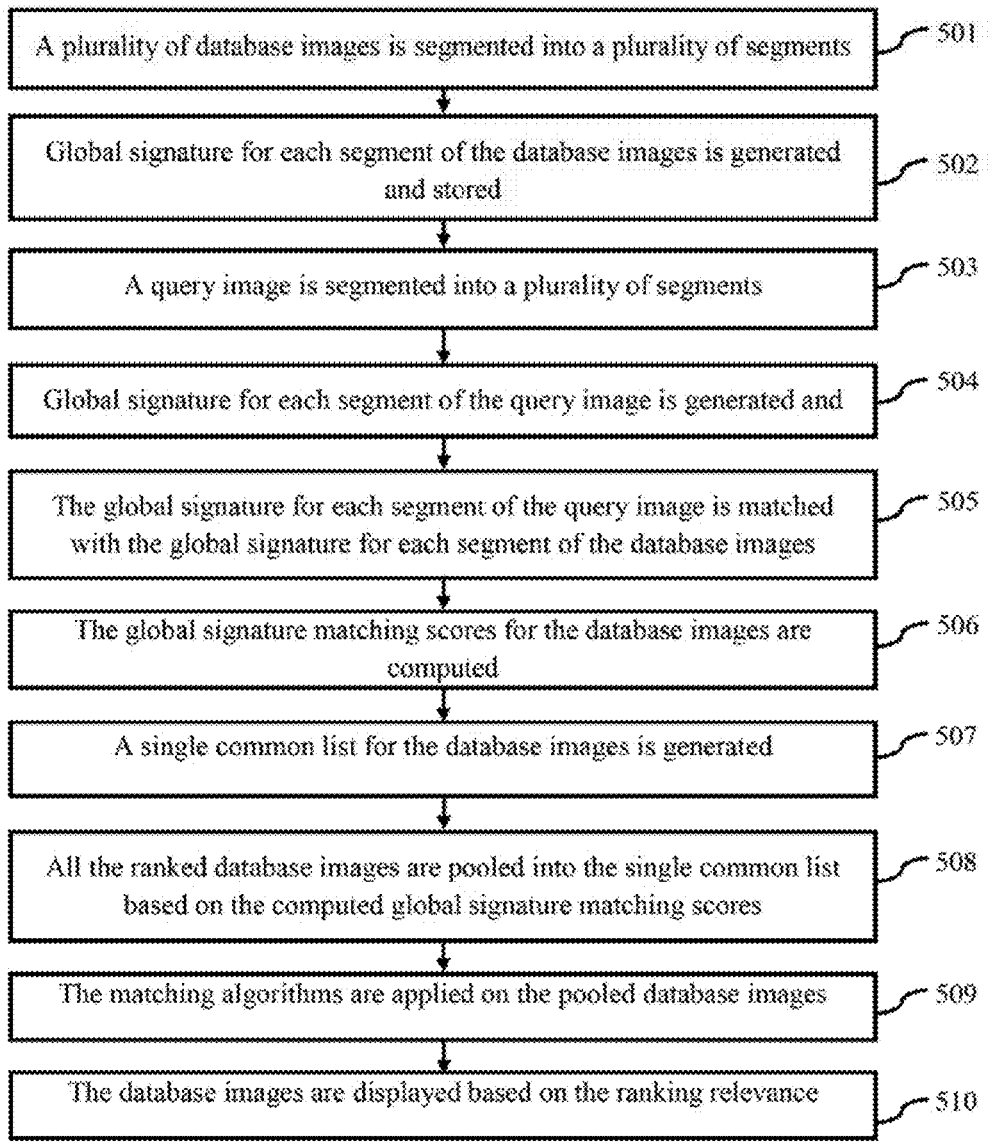
FIG. 5 illustrates a flowchart indicating a method of multi-stage image searching by segmenting an image into multiple stage image searching by segmenting an image into multiple segments, according to an embodiment herein.

FIG. 5 illustrates a flowchart explaining a method of multi-stage image searching by segmenting an image into multiple segments, according to one embodiment of the present invention. With respect to FIG. 5, the method comprises the following steps. The plurality of database images is segmented into a plurality of segments (501). A global signature for each segment of the database images is generated and stored in the server database (502). Further the query image is segmented into a plurality of segments (503). A global signature for each segment of the query image is generated and stored in the server database (504). The global signature of each segment of the query image is matched with the global signature of each segments of the plurality of database images (505) and a global signature matching score for the each database image is computed (506). Furthermore a single common list for the database images is generated (507). The database images are ranked based on the computed global signature matching scores and are pooled to the single common list (508). The pooling stage allows a predetermined maximum number of database images to be identified for the local feature matching process in order to limit the computational complexity. The matching algorithms are applied only on the pooled database images (509) and the pooled database images are displayed based on the ranking relevance (510).

Figure 6:
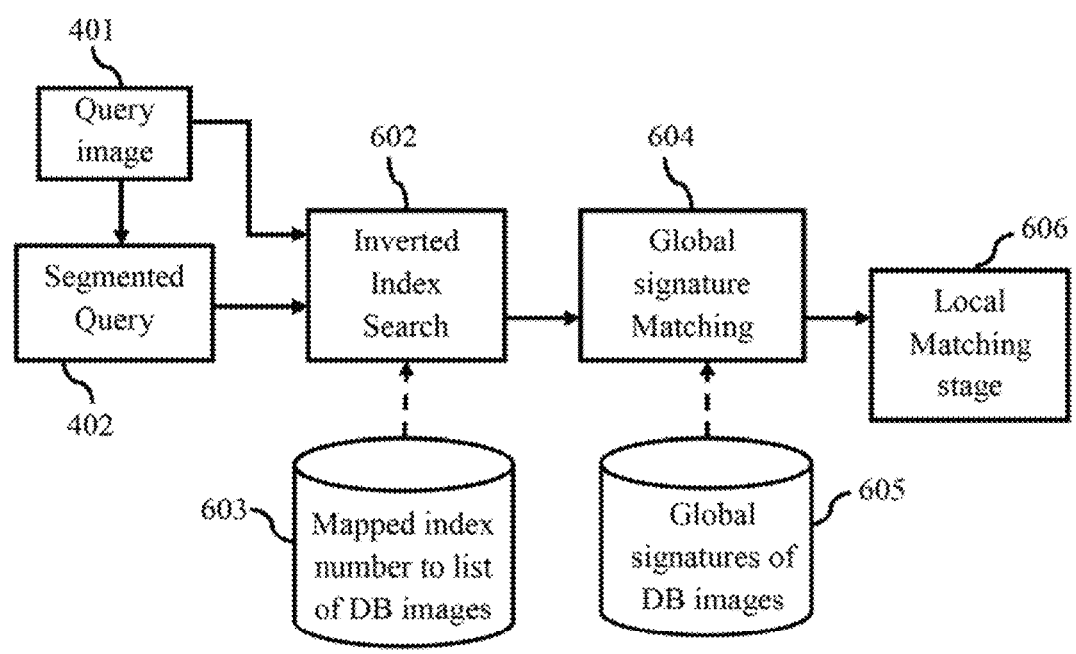
FIG. 6 illustrates a block diagram of a system for multi-stage image searching by applying an inverted index on a segmented query image, according to an embodiment herein.

FIG. 6 illustrates a block diagram of a system for multi-stage image searching by applying inverted index on a segmented query image, according to an embodiment of the present invention. With respect to FIG. 6, the query image 401 is segmented into plurality of segments 402 and a list of quantization corresponding to the features present in each segment of the segmented query image 402 is determined. Similarly, the database images are segmented and a list of quantization indices corresponding to the features present in each segment of the segmented database images are determined and stored in the server database 603. The inverted index search 602 identifies a set of database images that have non-zero occurrence of the determined query feature quantization indices. This reduces the set of images to be tested using the global stage. Further, the global signatures of the database images is computed and stored in the server database 605. Then, a global signature computing and matching module 604 computes and matches a global signature for each query segment with the global signatures of the database images 605 in the reduced set that is obtained using the inverted index search 602. This step is followed by a pooling stage, wherein all the database images that matches with the global signature of query image segments are pooled. Various pooling strategies are followed, such as, limiting the maximum number of images or using global matching score to select a subset of database images to be tested further. Finally, a local matching module 606 robustly determines the set of relevant database images corresponding to the query image.

According to an embodiment herein, a list of quantization indices corresponding to the features present in the query image 401 is determined. The database images are segmented and a list of quantization indices corresponding to the features present in each segment of the segmented database images are determined and stored in the server database 603. The inverted index search 602 identifies a set of database images that have non-zero occurrence of the determined query feature quantization indices. This reduces the set of images to be tested using the global stage. Further, the global signatures of the database images is computed and stored in the server database 605. Then, a global signature computing and matching module 604 computes and matches a global signature of the query image 401 with the global signatures of the database images 605 in the reduced set that is obtained using the inverted index search 602. This step is followed by a pooling stage, wherein all the database images that matches with the global signature of the query image 401 are pooled. Various pooling strategies are followed, such as, limiting the maximum number of images or using global matching score to select a subset of database images to be tested further. Finally, a local matching module 606 robustly determines the set of relevant database images corresponding to the query image 401.

According to an embodiment herein, the inverted index search 602 is employed before global matching stage to keep the search complexity at a fixed level instead of the complexity scaling up with the number of database images. The search complexity is controlled by the number of quantization indices listed for inverted index search.

Figure 7A:
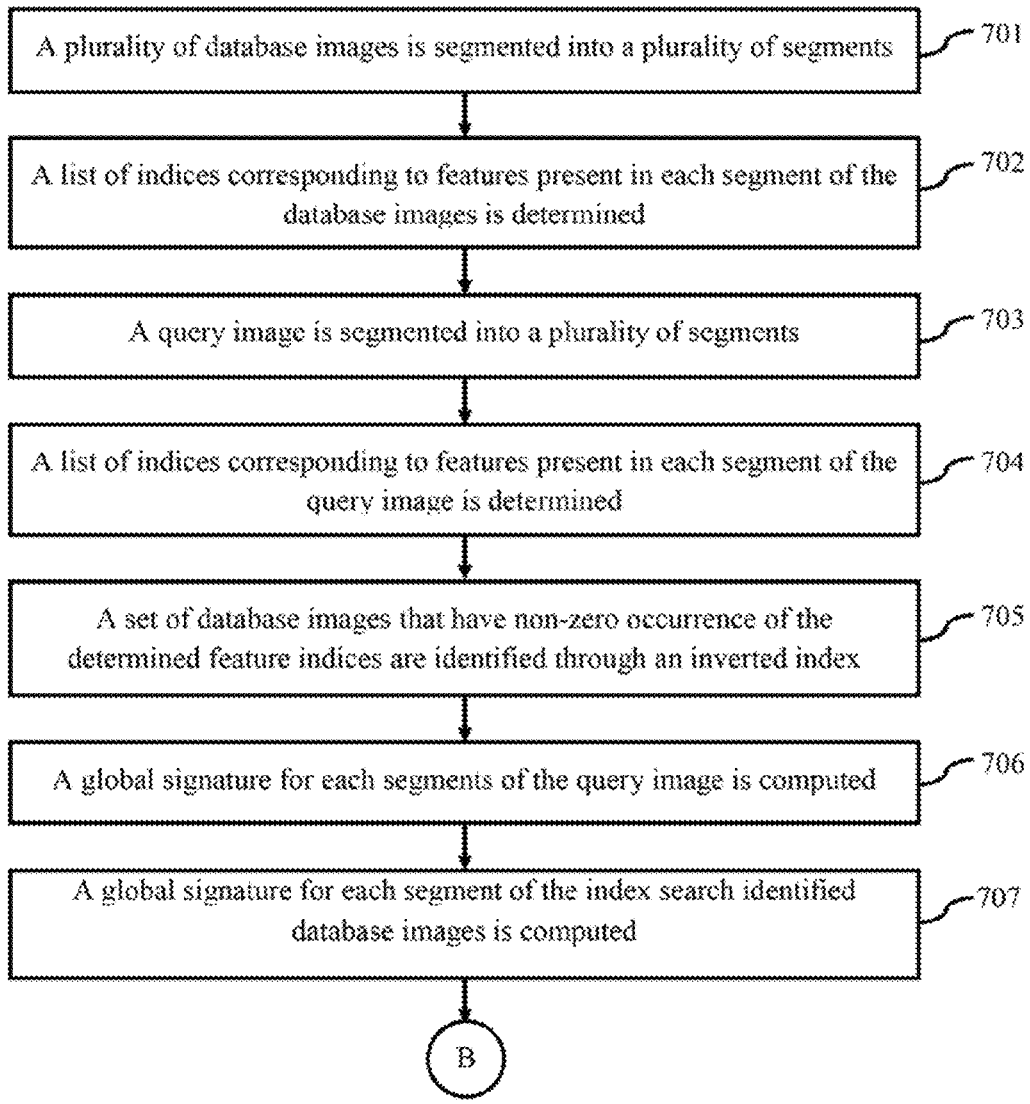
FIG. 7A and FIG. 7B jointly illustrates a flowchart indicating a method of multi-stage image searching by applying an inverted index on a segmented query image, according to an embodiment herein.
Figure 7B:
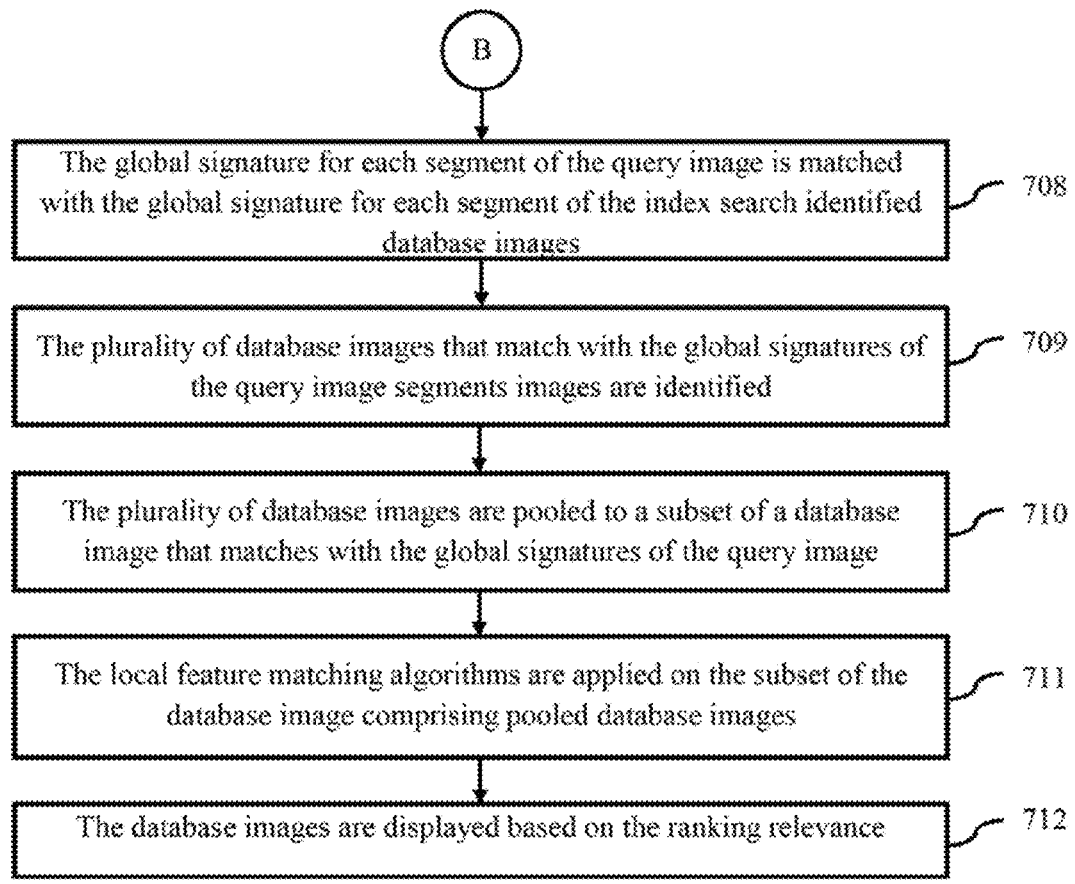

FIG. 7A and FIG. 7B jointly illustrate a flowchart explaining a method of multi-stage image searching by applying an inverted index search on a segmented query image, according to an embodiment of the present invention. With respect to FIG. 7A and FIG. 7B, the method comprises following steps. The plurality of database images is segmented into a plurality of segments (701). A list of quantization indices corresponding to features present in each segment of the database images is determined (702). The query image is segmented into a plurality of segments (703). A list of quantization indices corresponding to the features present in each segment of the query image is determined (704). Further a set of database images that have non-zero occurrence of the determined feature indices is identified through an inverted index search (705). The global signature for each of the segments of the query image is computed (706). The global signature for each of the segments of the database images identified through the inverted index search is computed (707). The global signatures of the query image segments are matched with the global signatures of the segments of database images that are identified through the inverted index search (708). The plurality of database images that have matching global signatures with that of the query image segments are identified (709). The plurality of database images are further pooled or grouped into a subset of database images up to a pre-determined maximum number of database images that matches with the global signatures of the query image segments (710). The local feature matching algorithms are applied only on pooled database images (711) and the resulting images are displayed based on the ranking relevance (712).

According to an embodiment herein, the set of relevant database images are treated as response to the search query and are presented to the user through the user interface module provided in the client application of the mobile device. The user is notified with the search results by directly transmitting to the client application installed in the mobile device from the central server. The user is provided with an opportunity to further filter and expand the search results of augmented reality, using the user preferences and contexts through user interface module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for image searching using geographical coordinates and time, the method comprises:
    acquiring a query image from a mobile device;
    extracting image features of the query image;
    extracting image features of the database images;
    calculating a matching score for the database image, and wherein the matching score is calculated based on differences between the extracted image features of the query image and the extracted image features of the database image;
    identifying matching database images based on the matching score; extracting geographical coordinates of the identified matching database images;
    extracting geographical coordinates of the query image, and wherein the geographical coordinates of the query image is matched with the geographical coordinates of the identified matching database images;
    extracting a time stamp of the query image;
    extracting a time information of meta data in the identified matching database image, and wherein the time stamp of the query image is matched with the time information of meta data in the identified matching database image;
    computing a joint matching score, and wherein the joint matching score is computed by mapping the calculated matching score of the database image, the matched results of the geographical coordinates of the query image and the geographical coordinates of the query image, and the matched time stamp of the query image with the time information of meta data in the database image;

defining a threshold matching score to identify a match between the query image and the database image, and wherein the database image is identified as a matching image to the query image when the computed joint matching score of the database images is less than the pre-defined threshold matching score;

ranking the database images based on the computed joint matching score; and displaying one or more database images by ranking based on the relevance.

2. The method according to claim 1, wherein the time stamp of the query image is a time of capturing an image through the mobile device, and wherein the time information of the database images is a time of storing an image in the database.

3. The method according to claim 1, wherein the database images are ranked based the computed joint matching score without any threshold check.

4. The method according to claim 1, wherein the joint matching score is computed based the a linear combination of the scores, and wherein the liner combination of scores comprises:

matching score of the database image;

matching score of the geographical coordinates of the query image and the geographical coordinates of the query image; and matching score of the time stamp of the query image with the time information of meta data in the database image.

\* \* \* \* \*